US010348620B2

(12) United States Patent
Bulusu et al.

(10) Patent No.: US 10,348,620 B2
(45) Date of Patent: *Jul. 9, 2019

(54) MINIMUM DISRUPTION MST RECONFIGURATION (MDMR)

(71) Applicant: Cisco Technology, Inc., San Jose, CA (US)

(72) Inventors: Shekher Bulusu, Fremont, CA (US); Francois Edouard Tallet, Santa Clara, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 751 days.

This patent is subject to a terminal disclaimer.

(21) Appl. No.: 14/804,559

(22) Filed: Jul. 21, 2015

(65) Prior Publication Data

US 2015/0326472 A1    Nov. 12, 2015

Related U.S. Application Data

(63) Continuation of application No. 12/628,511, filed on Dec. 1, 2009, now Pat. No. 9,112,724.

(51) Int. Cl.
*H04L 12/46* (2006.01)
*H04L 12/753* (2013.01)

(52) U.S. Cl.
CPC .......... *H04L 45/48* (2013.01); *H04L 12/462* (2013.01); *H04L 12/4641* (2013.01)

(58) Field of Classification Search
CPC .... H04L 45/48; H04L 12/462; H04L 12/4641

USPC ........................................................ 709/221
See application file for complete search history.

(56) References Cited

U.S. PATENT DOCUMENTS

| 6,801,506 | B1 | 10/2004 | Dey |
| 6,813,250 | B1 | 11/2004 | Fine et al. |
| 6,937,576 | B1 * | 8/2005 | Di Benedetto ....... H04L 12/462 370/256 |
| 7,177,946 | B1 | 2/2007 | Kaluve et al. |
| 7,180,899 | B2 | 2/2007 | De Silva et al. |
| 7,286,491 | B1 | 10/2007 | Smith |
| 7,480,258 | B1 * | 1/2009 | Shuen ..................... H04L 45/00 370/217 |
| 7,499,456 | B2 | 3/2009 | De Silva et al. |
| 7,606,939 | B1 | 10/2009 | Finn |
| 7,792,056 | B2 | 9/2010 | Sullivan et al. |
| 8,693,375 | B2 | 4/2014 | Reichstein et al. |
| 2004/0105455 | A1 | 6/2004 | Seaman |

(Continued)

*Primary Examiner* — George C Neurauter, Jr.
(74) *Attorney, Agent, or Firm* — Polsinelli PC (57) ABSTRACT

In one embodiment, a first multiple spanning tree (MST) region configuration for an MST process may be maintained at a switch in a computer network, where the first configuration has a virtual local area network (VLAN)-to-instance (VI) mapping that maps each of one or more VLANs to one of one or more MST instances in the MST region. The switch may subsequently receive a second MST region configuration that has a different VI mapping than the first configuration, and may determine one or more VLANs of the second configuration that have a different VI mapping from the first configuration ("affected VLANs"). Accordingly, in response to a trigger to apply the second configuration at the switch, the affected VLANs are blocked for a delay, and the second configuration may be applied at the switch without restarting the MST process.

20 Claims, 7 Drawing Sheets

(56) References Cited

U.S. PATENT DOCUMENTS

| | | | |
|---|---|---|---|
| 2006/0074736 A1* | 4/2006 | Shukla | G06Q 10/06 |
| | | | 717/100 |
| 2006/0198323 A1 | 9/2006 | Finn | |
| 2007/0140147 A1* | 6/2007 | Touve | H04L 12/4641 |
| | | | 370/255 |
| 2008/0031266 A1 | 2/2008 | Tallet et al. | |
| 2008/0089245 A1 | 4/2008 | Reichstein et al. | |
| 2008/0144533 A1 | 6/2008 | Bulusu et al. | |
| 2008/0250266 A1 | 10/2008 | Desai et al. | |
| 2009/0271529 A1* | 10/2009 | Kashiyama | G06F 17/30477 |
| | | | 710/1 |

* cited by examiner

MINIMUM DISRUPTION MST RECONFIGURATION (MDMR)

RELATED APPLICATIONS

This application is a continuation of U.S. patent application Ser. No. 12/628,511, titled "MINIMUM DISRUPTION MST RECONFIGURATION," filed on Dec. 1, 2009, the content of which is incorporated by reference herein in its entirety.

TECHNICAL FIELD

The present disclosure relates generally to computer networks, and, more particularly, to multiple spanning tree (MST) technology and related protocols.

BACKGROUND

Spanning Tree Protocols (STPs) offer numerous known advantages regarding the management of loop-free layer-2 network topologies. The Multiple Spanning Tree (MST) protocol is an enhanced STP that allows for a plurality of "instances," where each instance has its own network topology. Virtual Local Area Networks (VLANs) may then be mapped to a particular instance (a "VLAN-to-Instance" or "VI" mapping, e.g., manually configured), and all bridges/switches that share that VI mapping are considered to be within the same "region." To change the configuration of a region, such as changing the VI mapping within the region, a system administrator may either manually visit each switch one at a time to reconfigure the mapping (during a scheduled maintenance window without network traffic to avoid looping, blackholing, or other errors), or may employ the use of a configuration distribution protocol that advertises the new VI mapping to each switch of the region. Currently, any changes to the MST VI mapping causes a restart of the entire MST protocol (the MST process at each switch), causing traffic disruption on all of the VLANs in the region, even where only a few of the VLANs have been remapped.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a first multiple spanning tree (MST) region configuration for an MST process may be maintained at a switch in a computer network, where the first configuration has a virtual local area network (VLAN)-to-instance (VI) mapping that maps each of one or more VLANs to one of one or more MST instances in the MST region. The switch may subsequently receive a second MST region configuration that has a different VI mapping than the first configuration, and may determine one or more VLANs of the second configuration that have a different VI mapping from the first configuration ("affected VLANs"). Accordingly, in response to a trigger to apply the second configuration at the switch, the affected VLANs are blocked for a delay (e.g., to allow for convergence of the affected VLANs), and the second configuration may be applied at the switch without restarting the MST process (e.g., for the non-affected VLANs).

Description
Network Architecture

A computer network typically comprises a plurality of interconnected entities. An entity may consist of any network device, such as a server or end station, that "sources" (i.e., transmits) or "sinks" (i.e., receives) data frames. A common type of computer network is a local area network ("LAN"), which typically refers to a privately owned network within a single building or campus. LANs typically employ a data communication protocol (LAN standard), such as Ethernet, FDDI or token ring, that defines the functions performed by the data link and physical layers of a communications architecture (i.e., a protocol stack).

One or more intermediate network devices are often used to couple LANs together and allow the corresponding entities to exchange information. For example, a switch (or bridge) may be used to provide a "switching" (or "bridging") function between two or more LANs. Typically, the switch is a computer and includes a plurality of ports that are coupled to the LANs. Ports that are coupled to LANs that are, in turn, coupled to other switches are generally referred to as a trunk ports, whereas ports used to couple switches through LANs to end stations are generally referred to as access ports. The switching function includes receiving data from a sending entity at a source port and transferring that data to at least one destination port for forwarding to a receiving entity.

Although bridges/switches may operate at various levels of the communication protocol stack, they typically operate at Layer-2, which, in the OSI Reference Model, is called the data link layer and includes the Logical Link Control (LLC) and Media Access Control (MAC) sub-layers. Data frames at the data link layer typically include a header containing the MAC address of the entity sourcing the message, referred to as the source address, and the MAC address of the entity to which the message is being sent, referred to as the destination address. To perform the switching function, Layer-2 switches examine the MAC destination address of each data frame received on a source port. The frame is then switched onto the destination port(s) associated with that MAC destination address.

Other devices, commonly referred to as routers, may operate at higher communication layers, such as Layer-3 of the OSI Reference Model, which in Transmission Control Protocol/Internet Protocol (TCP/IP) networks corresponds to the Internet Protocol (IP) layer. Packets at the IP layer also include a header, which contains an IP source address and an IP destination address. Routers or Layer-3 switches may re-assemble or convert received data frames from one LAN standard (e.g., Ethernet) to another (e.g. token ring). Thus, Layer-3 devices are often used to interconnect dissimilar subnetworks.

Figure 1:
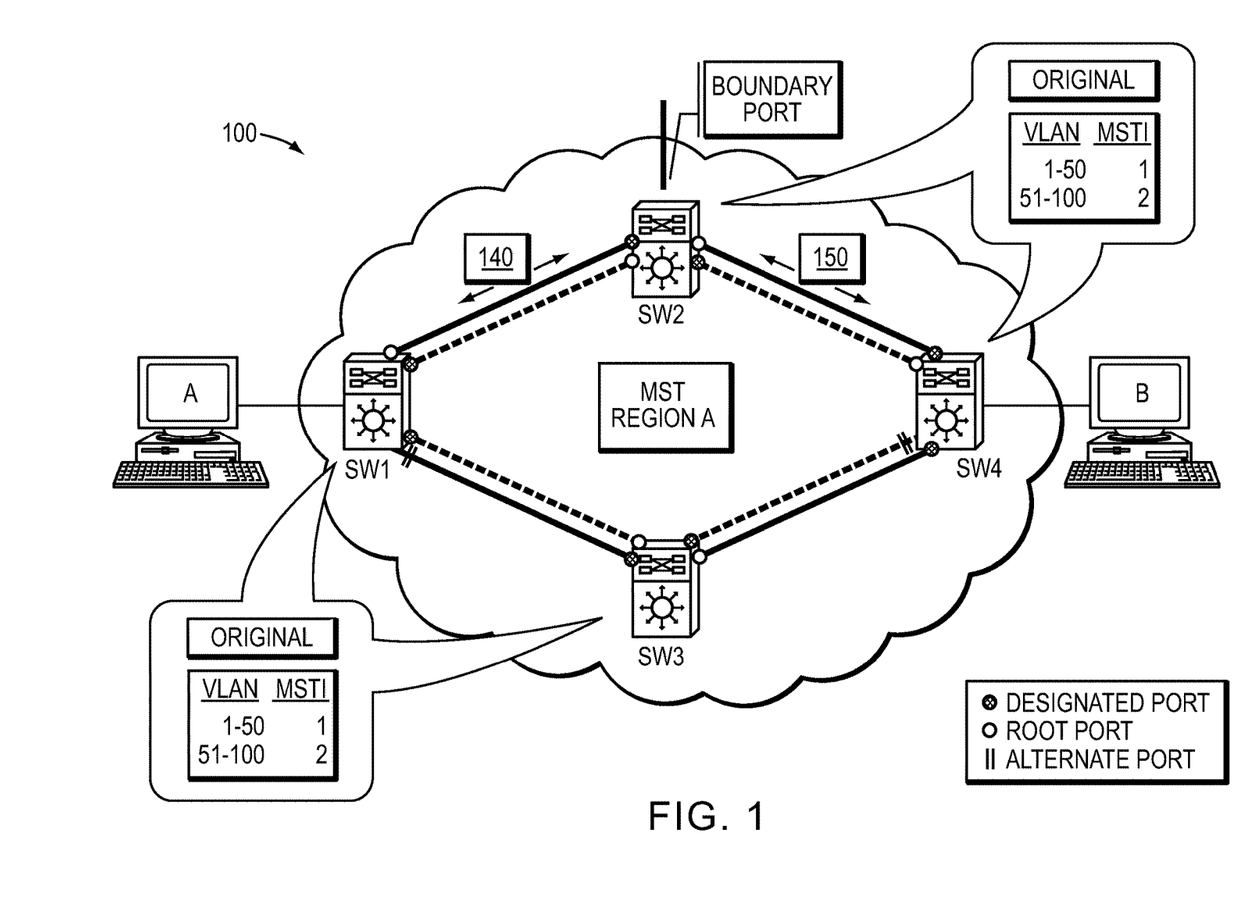
FIG. 1 illustrates an example computer network.

FIG. 1 is a schematic block diagram of an example computer network 100 illustratively comprising nodes/devices, such as switches "SW1-SW4" interconnected by links as shown (e.g., within a shared "region," as described herein and/or as understood by those skilled in the art). The region of switches may be used to interconnect one or more other devices, such as computers "A" and "B" (via switch SW1 and SW4, respectively), as well as other portions of the network 100 (e.g., via SW2). Notably, any number of nodes, devices, links, etc. may be used in the computer network, and the view shown herein is for simplicity. The computer network 100 of FIG. 1 is meant for illustration purposes only and is not meant to limit the embodiments described herein.

Figure 2:
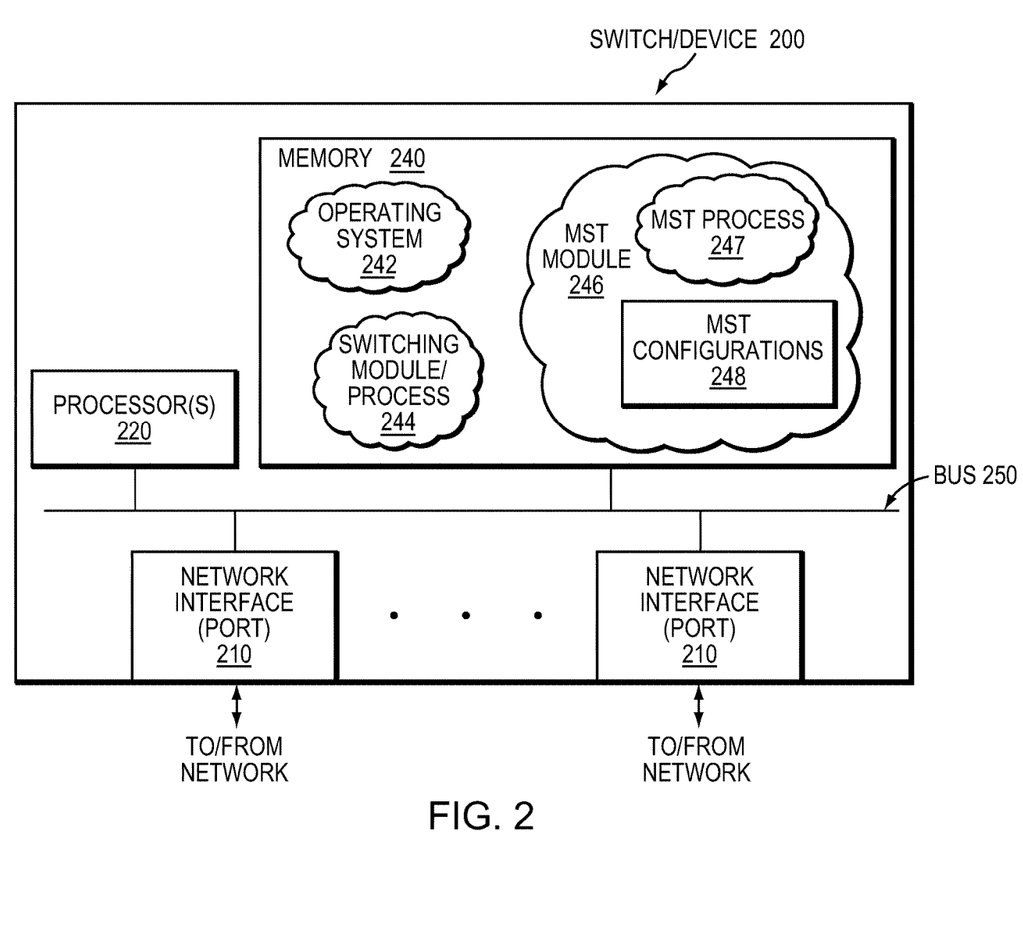
FIG. 2 illustrates an example network device/node.

FIG. 2 is a schematic block diagram of an example node/device 200 that may be used with one or more embodiments described herein, e.g., as a switch (or bridge). The device comprises a plurality of network interfaces or ports 210, one or more processors 220, and a memory 240 interconnected by a system bus 250. The network interfaces/ports 210 contain the mechanical, electrical, and signaling circuitry for communicating data over physical links coupled to the network 100. The network interfaces/ports may be configured to transmit and/or receive data (frames) using a variety of different communication protocols over physical links or wireless links, for instance with the communication with other switches in the network 100. For example, such communication protocols may include, inter alia, TCP/IP, UDP, ATM, synchronous optical networks (SONET), wireless protocols (e.g., IEEE Std. 802.11), Frame Relay, Ethernet (e.g., IEEE Std. 802.3), Fiber Distributed Data Interface (FDDI), etc. Notably, a network interface/port 210 may also be used to implement one or more virtual network interfaces, such as for Virtual Private Network (VPN) access or Virtual LANs (VLANs), as will be understood by those skilled in the art. Illustratively, the handling of frames within the network interfaces/ports 210 may conform to a protocol stack (not shown) that defines the functions performed by the data link and physical layers of a communications architecture.

The memory 240 comprises a plurality of storage locations that are addressable by the processor(s) 220 and the network interfaces/ports 210 for storing software programs and data structures associated with the embodiments described herein. The processors 220 may comprise necessary elements or logic adapted to execute the software programs and processes and manipulate the data structures, such as MST configurations 248, as described herein. An operating system 242 (e.g., the Internetworking Operating System, or IOS™, of Cisco Systems, Inc.), portions of which are typically resident in memory 240 and executed by the processor(s), functionally organizes the node by, inter alia, invoking network operations in support of software processes and/or services executing on the device. It will be apparent to those skilled in the art that other types of processors and memory, including various computer-readable media, may be used to store and execute program instructions pertaining to the technique described herein.

Portions of the device 200 may be organized as particular components or modules that are configured to perform various processes and/or services for the device. For instance, these components or modules may be hardware, software, firmware, logic (e.g., on an application-specific integrated circuit or "ASIC"), etc., depending upon implementation and functionality, as may be appreciated by those skilled in the art. For example, certain processes and/or services as used herein may comprise an illustratively simplified "switching module" (or "switching process") 244, along with an illustrative MST module/process 246, as described herein (both shown stored/executed within memory 240 as one example implementation). As described herein, one particular process within (or in conjunction with) MST module 246 is MST process 247 (the significance of which being set forth below).

Switching module/process 244 contains computer executable instructions executed by the processor(s) 220 to perform various functions relating to switches (or bridges) in general, as may be appreciated by those skilled in the art. For instance, a communication process/service of switching module process 244 may perform functions provided by one or more communication protocols, such as various switching/bridging protocols. These functions may be configured to manage switching databases (e.g., spanning tree instances), filtering databases (FDBs), or forwarding information databases (FIBs) containing, e.g., data used to make switching/forwarding decisions. In particular, as part of communication process/services, a spanning tree process may execute to perform functions provided by one or more spanning tree protocols (STPs), such as the known Rapid STP (RSTP) and/or Multiple STP (MST). Illustratively, RSTP and MST may be employed on the network devices (switches) to establish and maintain one or more spanning tree instances, converging the network in response to topology changes, as may be understood by those skilled in the art.

For instance, as noted above, STPs offer numerous known advantages regarding the management of loop-free layer-2 network topologies. In particular, the Multiple Spanning Tree (MST) protocol is an enhanced STP that allows for a plurality of "instances," where each instance has its own network topology (e.g., in the figures shown as solid or dashed lines). VLANs may then be mapped to a particular instance (a "VLAN-to-Instance" or "VI" mapping, e.g., manually configured), and all bridges/switches that share that VI mapping are considered to be within the same "region." To change the configuration of a region, such as changing the VI mapping within the region, a system administrator may either manually visit each switch one at a time to reconfigure the mapping (during a scheduled maintenance window without network traffic to avoid looping, blackholing, or other errors), or may employ the use of a configuration distribution protocol that advertises the new VI mapping to each switch of the region.

Currently, any changes to the MST VI mapping requires a restart of the entire MST protocol (the MST process 247 at each switch), causing traffic disruption on all of the VLANs in the region, even where only a few of the VLANs have been remapped. For example, when a new VI mapping is introduced at a switch, that switch changes to a new region, and is not in the original region anymore. (Note, also, that an administrator may actually lose connectivity to certain switches during an incrementally changed network; that is, the MST regions may be fractured in an inaccessible way, as may be appreciated by those skilled in the art.) Upon changing to the new region (the new VI mapping), the switch (MST module 246) stops all forwarding of traffic, reconfigures the MST instances, and restarts its MST process 247 (assigning port roles, etc.) to begin forwarding traffic again. Typically, this may result in an undesirable period of time (e.g., approximately 30 seconds) without forwarding any traffic in the network.

Minimum Disruption MST Reconfiguration

According to one or more embodiments of the disclosure, the overall impact to the traffic in the network may be minimized, particularly, only those VLANs affected by the reconfiguration are impacted. In this manner, the non-affected VLANs remain primarily untouched (e.g., without interruption), which, since very often only a small number of VLANs are moved/affected, results in largely un-affected network traffic. Specifically, as described in more detail below, minimum disruption MST reconfiguration (MDMR) consists of, for example, advertising a new configuration within a region (e.g., pushing the new configuration to all switches) without immediately applying it, and identifying difference between the new configuration and original configuration (i.e., the affected VLANs). Then, based on a trigger, the switches may block the affected VLANs and apply the new configuration at the same time, such that the ports for affected VLANs remain blocked while their information (new configuration) is propagated across the entire network (region).

Conversely, as noted, prior techniques would receive the new configuration, stop the MST process 247 for the original configuration (block all VLANs), and restart the MST process 247 for the new configuration (e.g., negotiation and converging the region to determine the state (such as color blocking logic or "CBL") and roll of each port, etc., particularly troublesome where other switches have yet to update to the new configuration). While this prior technique would interrupt traffic flow in the network of all VLANs for valuable amounts of time (e.g., 30 seconds), the new techniques described herein require minimal interruption only to the affected VLANs.

Illustratively, the techniques described herein may be performed by hardware, software, and/or firmware, such as in accordance with an MST module 246, which may contain computer executable instructions executed by the processor 220 to perform functions relating to the novel techniques described herein. For instance, a component of MST module 246 is the MST process 247, which specifically refers to the operation of an MST protocol within a region to negotiate and converge upon the state and roll of each port of the switches within the region, as may be appreciated by those skilled in the art.

Figure 3:
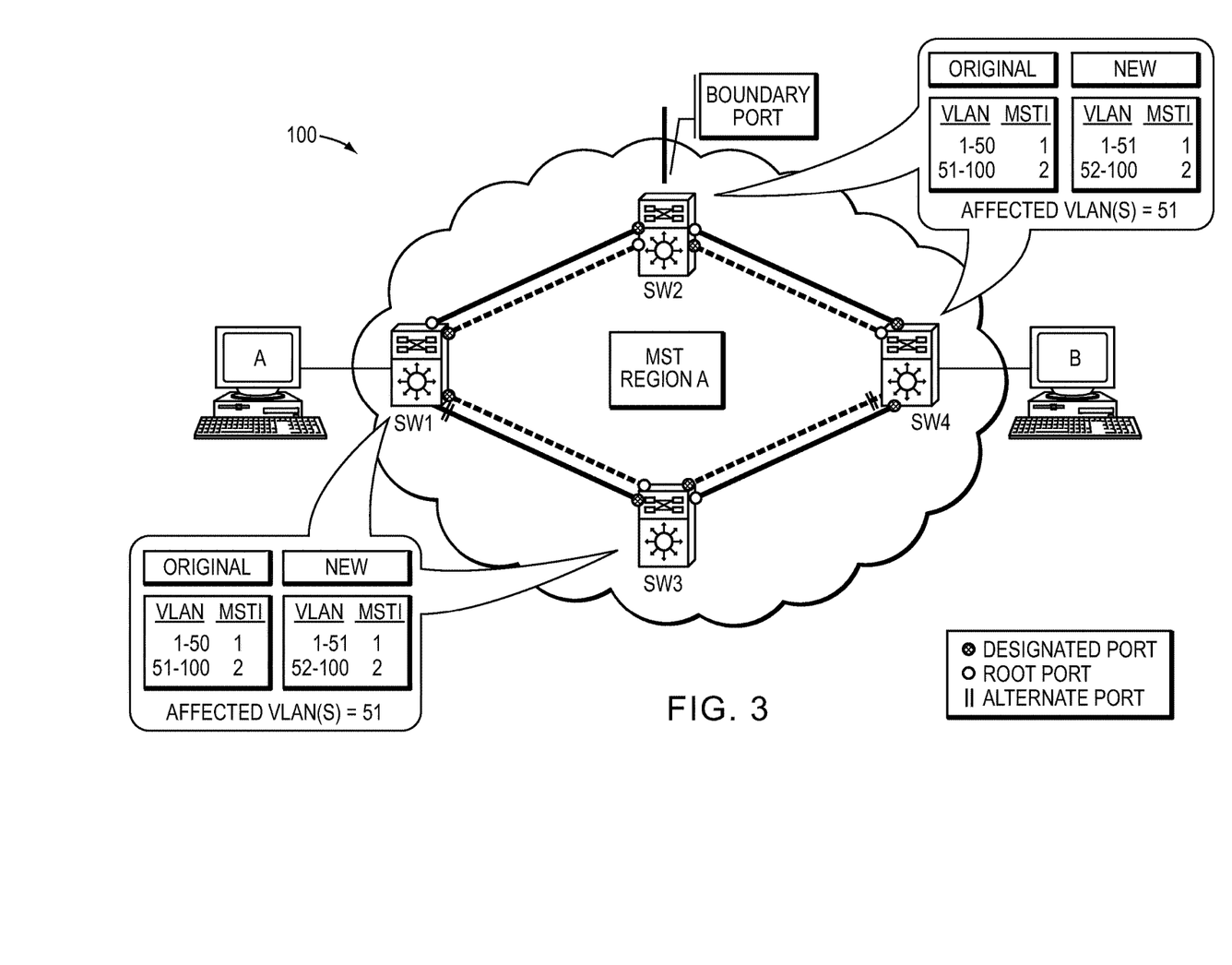
FIGS. 3 and 4A-4B illustrate example arrangements and transitions of MST regions within the computer network.

Minimum disruption MST reconfiguration (MDMR) provides a solution to restrict the impact of changing an MST region's VLAN-to-Instance (VI) mapping to only the affected VLANs. In particular, assume that a switch 200 in the network 100 maintains a first MST region configuration (e.g., an "original" configuration) for the MST process 247 at the switch (that is, with a VI mapping that maps each of one or more VLANs to one of one or more MST instances in the MST region). For example, assume, as shown in FIG. 3 (and FIG. 1), that a region "A" has an original VI mapping of:

Instance 1 (MSTI-1)=>VLANs 1-50; and
Instance 2 (MSTI-2)=>VLANs 51-100.

(Notably, a default instance, Instance 0, not shown, may comprise remaining VLANs 101-4094, as may be appreciated by those skilled in the art.) Assume further, for example, that an administrator desires to move VLAN 51 from MST Instance 2 to MST Instance 1. As noted, the current MST implementation would require a restart of the entire MST protocol (MST process 247), causing traffic disruption on all the VLANs. However, with the techniques described herein (MDMR), the traffic disruption would be limited to only VLAN 51 (the affected VLAN).

Operationally, MDMR may utilize a mechanism to propagate the updated (new) VI mapping (new configuration) to all the switches within the MST Region (e.g., region A). For example, any existing mechanism can used, such as a simple network management protocol (SNMP) or a VLAN trunking protocol (VTP, e.g., VTP3) or any other management mechanism (e.g., as selected by the domain administrator) to propagate the second configuration throughout the MST region. This mechanism may, though need not, ensure that the new MST configuration is locked on all the switches (e.g., by notifying the root switch that propagation is completed within the region). In response to receiving a new MST region configuration (i.e., that has a different VI mapping than the original configuration), the MST module 246 of each switch may determine one or more VLANs of the new configuration that specifically have a different VI mapping from the original configuration (called "affected VLANs").

During a next phase of MDMR, a trigger may be issued/determined to apply the new configuration at each switch of the network. Illustratively, the trigger for the transition is receipt of an MST bridge protocol data unit (BPDU) with the "new" configuration (the new region, e.g., a new name, revision, and/or checksum) from a neighboring switch (e.g., on port facing the root switch). In particular, a root switch (as will be understood), or any other switch, may initiate the trigger by transmitting a first BPDU of the new configuration on each of its ports within the region (such as after a timer, or after learning that all switches have received the new configuration). That is, the new configuration may have first been distributed to all of the switches using a management protocol, but the first BPDU (an STP specific message that results in STP/MST action) may be the initiating trigger to perform the techniques herein. (Alternatively, the trigger may be a specific date and time shared by all switches in the MST region, such as a network time, such as 5:00 Tuesday, or 30 minutes from receipt of the original BPDU, etc.)

Each switch receiving the trigger (e.g., the new BPDU) would then block the affected VLANs that changed their VI mapping, and apply the second configuration at the switch without restarting the MST process 247. The receiving switches may also begin to advertise the new BPDU themselves to their neighboring switches. It is important that all the switches in the MST region place the affected VLANs into a blocked state for a delay until the new MST region configuration has been given the chance to propagate to all the switches in the MST region. For instance, waiting for twice a known "Forward Delay" of the region would suffice to propagate the new MST region configuration BPDUs throughout the MST region. Accordingly, the switches may be configured to wait for twice the Forward Delay time before unblocking the affected VLANs and moving the corresponding port state of the affected VLAN(s) to its new respectively mapped MST instance port state (i.e., determining a forwarding delay value of the MST region, and setting the delay to twice the forwarding delay value.) (Alternatively, the delay here may also be set to a date and time shared by all switches in the MST region.) Note that when (or if) the port state of the affected VLAN(s) is transitioned to "forwarding" for the new configuration, then the switch may generate (e.g., flood) a Topology Change notification (e.g., BPDU), accordingly.

If a neighbor does not reciprocate the new configuration eventually, then it may be deemed an external neighbor (a "boundary" port), and the default instance (e.g., Instance 0) may be used over that port. That is, in response to determining that a returned BPDU having the second configuration is not received from a particular neighboring switch on a particular port by expiration of the delay, the particular port may be set as a boundary port for the MST region (e.g., the upward facing port on SW2 in the figures). In other words, if the neighbor continues to send the old configuration (or, for some reason, and entirely different configuration) beyond the delay, then the neighbor is in a different region, and the port becomes a boundary port. (A "boundary" port, as used herein, describes a label placed on a port that continues receives BPDUs from a different region (in general, this port is blocking; if no BPDUs are received, the port is not blocking and it is not a "boundary").

Figure 4A:
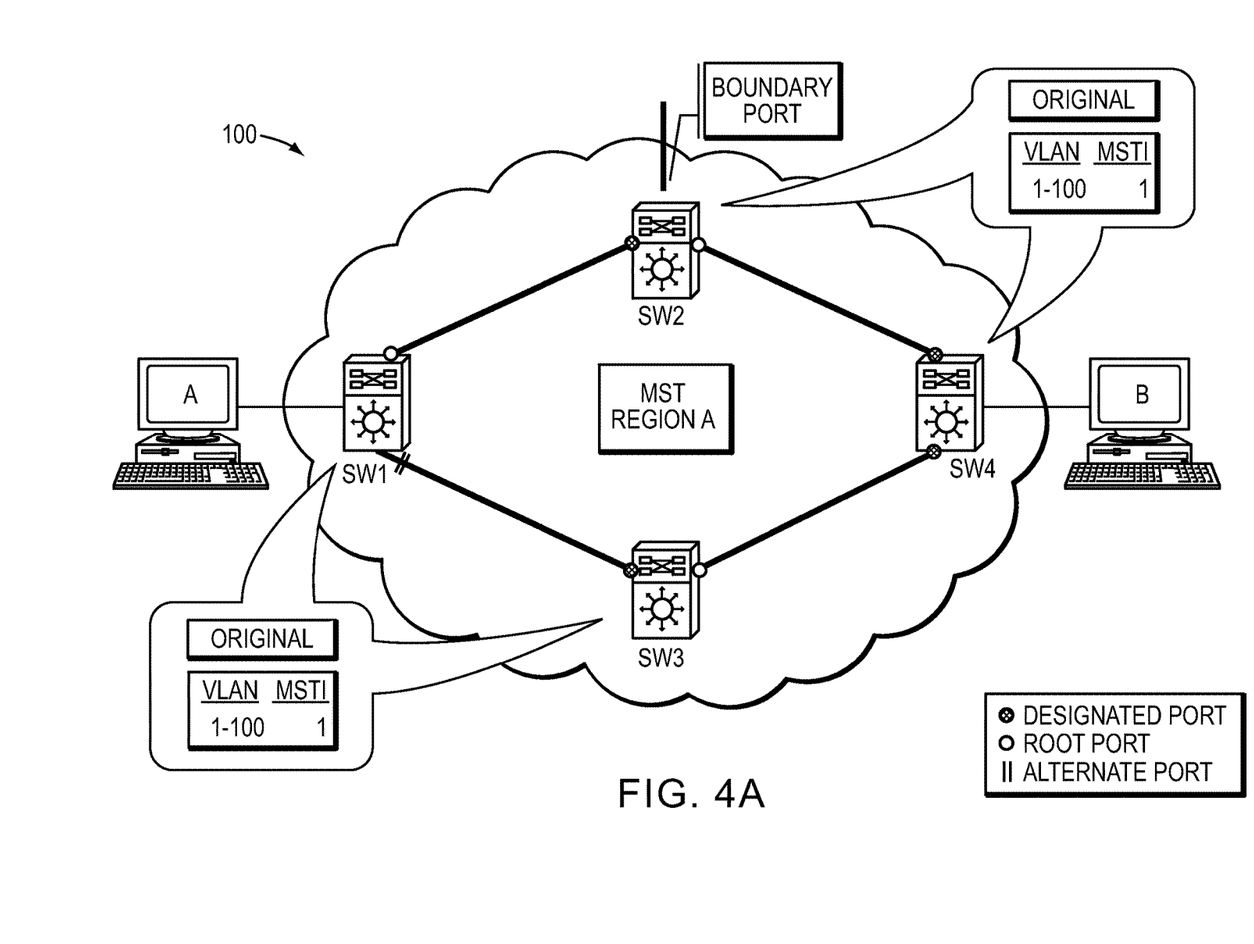
Figure 4B:
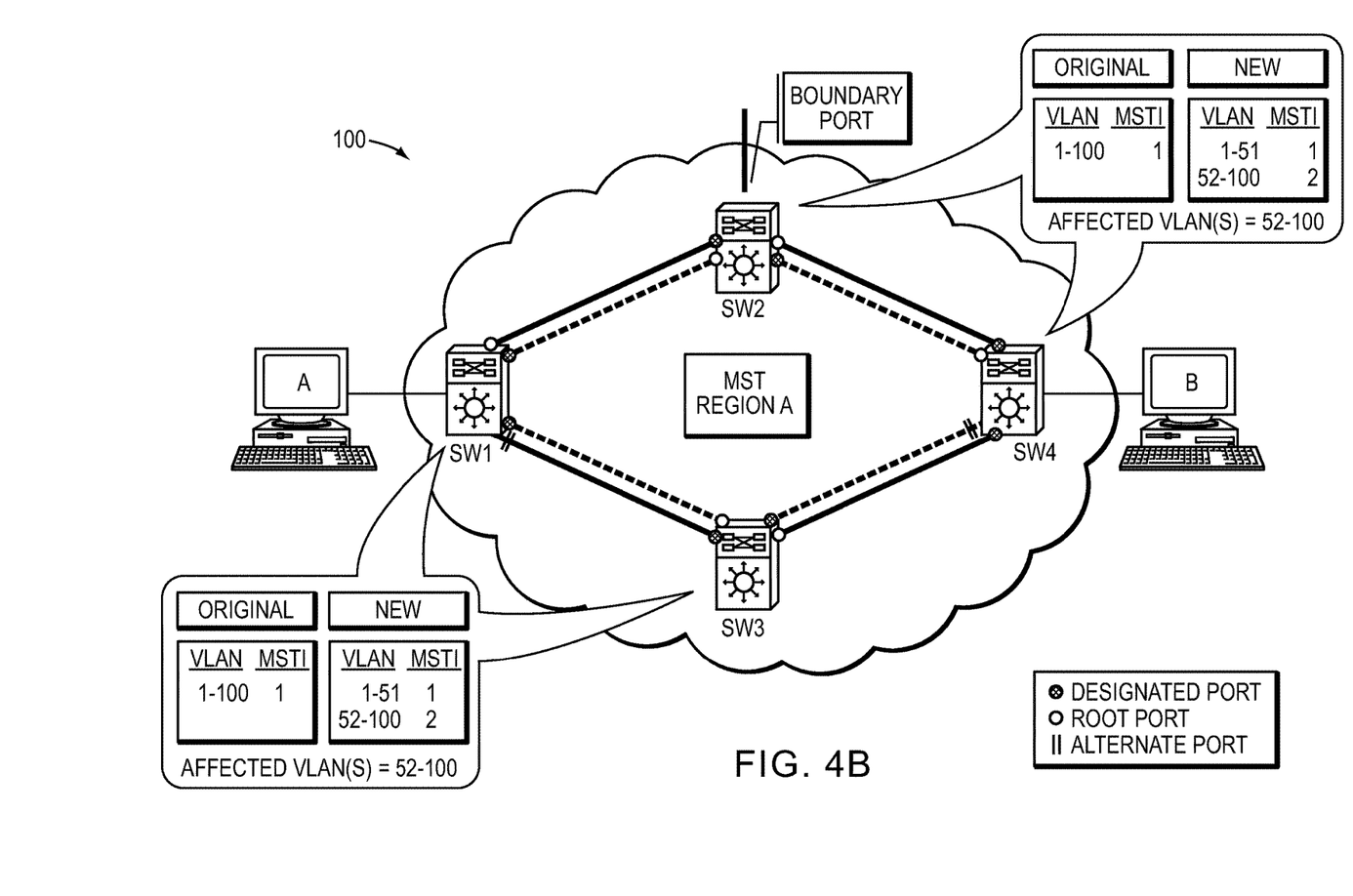

Note that the above reference to FIG. 3 relates to when a new instance is not created (i.e., Instance 1 and Instance 2 previously existed, and VLANs are merely exchanged between the two). As such, converging from the original configuration to the new configuration should not impact the MST process since each instance has already been established. That is, the affected VLANs are blocked to ensure that the change (update) is applied everywhere within the network before beginning to forward traffic based on the affected VLANs new MST instance. Conversely, however, where a new instance is created for a new VI mapping, the new instance may need to be established accordingly. FIG. 4A illustrates an example network with a single instance 1, to which VLANs 1-100 are mapped. In a similar manner to that described above (FIG. 3), a new configuration may be distributed, but now with a new instance 2, to which VLANs 52-100 are to be mapped (FIG. 4B). If there is a new instance in the new configuration, (e.g., instance 2), then the new MST instance is established (e.g., starting the MST process for only that instance to negotiate and converge on port state and rolls for the new instance), thus disturbing (blocking) only those VLANs that are moved to the new instance (e.g., VLANs 52-100). (Note that VLANs may be moved within existing instances and new instances may be created in the same configuration, and the separate description is merely for illustrative purposes. Accordingly, at least all VLANs mapped to a new MST instance in the new configuration are affected VLANs, as well as any other affected VLANs moved to a new MST instance.)

The timer-based region configuration update techniques above may be applied to shared link networks in addition to point-to-point (P2P) networks. On the other hand, a is "proposal-agreement" model may be used, such as for P2P media, as well. (Hybrid arrangements of the timer-based and proposal-agreement techniques may also be used.) For instance, a root switch may start a "new MST region update timer" and begin sending a BPDU with the new region configuration with a proposal bit set. As each switch receives the BPDU with the proposal bit set (e.g., from a neighboring switch on a root port of the receiving switch), they accept the BPDU and start their own "new MST region update timer" while synching all of its designated ports (e.g., non-root ports within the region), sending out BPDUs with proposal bits set on non-root ports to neighboring switches.

According to this "proposal-agreement" model, the switches may move to the new region configuration and move the state of the affected VLANs to the new MST instance in response to receiving an agreement from all neighboring (non-root) switches, or upon expiration of the "new MST region update timer" for any remaining port. In particular, if the "new MST region update timer" expires without receiving an agreement BPDU, then any port correspondingly receiving a BPDU with the old configuration is treated as external (i.e., is a boundary port. In other words, in response to not receiving a BPDU with an agreement bit set from a particular neighboring switch on a particular non-root designated port prior to expiration of the delay/timer, the switch may set the particular port on the switch as a boundary port for the MST region. (Said differently, the delay may last until or become nullified when the switch has received a BPDU with an agreement bit set from each of the corresponding neighboring switches on the non-root designated ports.) The switch need not wait for agreement (or boundary setting) for all non-root ports prior to returning a BPDU for the new configuration on the root port with an agreement bit set (not shown), while blocking the affected VLANs on each port until that port has received an agreement. In this manner, the new configuration is not stalled by a single switch not in agreement.

Figure 5:
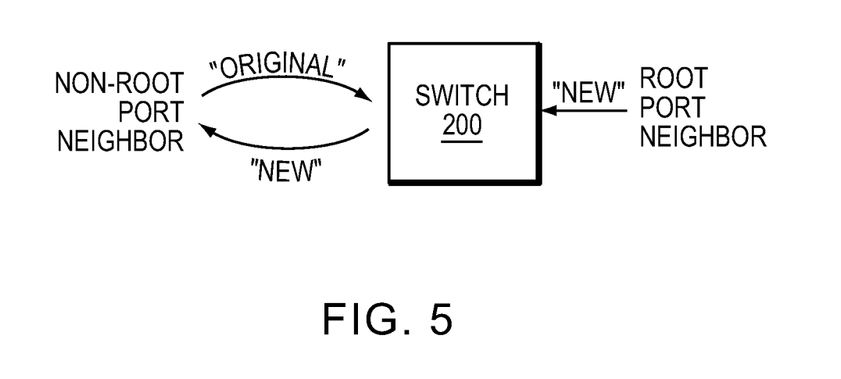
FIG. 5 illustrates an example message passing sequence.

Notably, in either scenario described above, the switches in the network 100 would be configured to handle two MST Region configurations at the same time: the original and the new. That is, during the transition, switches are configured to treat both MST regions (BPDUs from both regions) as "internal" (rather than "external"), as may be appreciated by those skilled in the art. For instance, each switch may maintain the original and new configurations simultaneously until the delay has expired, or until the new configuration has been applied by all neighboring switches (e.g., on all ports of the switch), such that the network has converged. As shown in FIG. 5, a switch 200 may have received the new configuration (from an updated neighbor) and applied the new configuration, but may still receive the old configuration from a non-updated neighbor. According to the techniques herein, the old configuration is not unacceptable (until expiration of the timer), and thus is not rendered as a boundary port (a mismatched region/configuration), therefore giving the non-updated neighbor time to update/refresh its configuration to the new configuration, accordingly.

Figure 6:
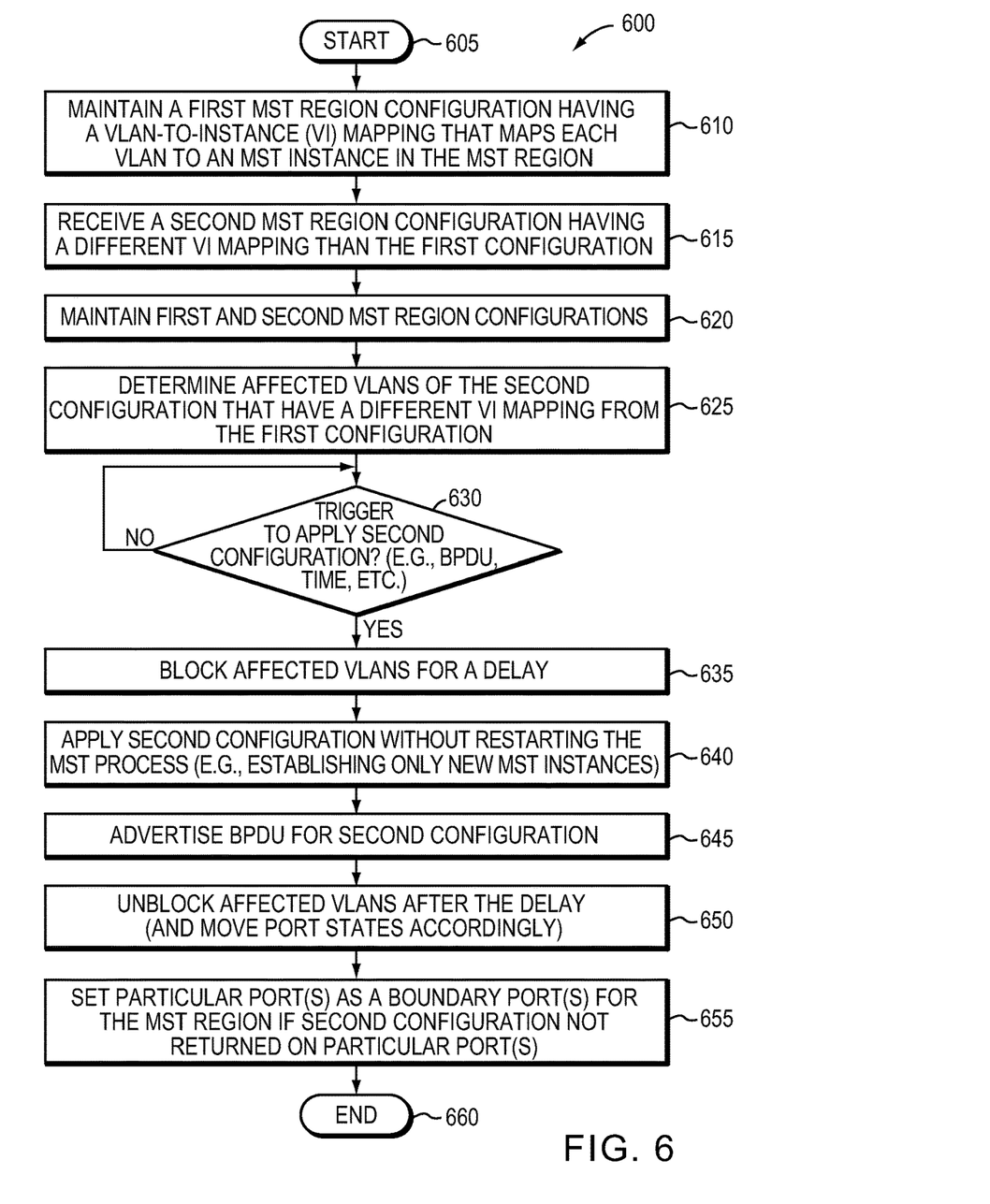
FIG. 6 illustrates an example procedure for minimum disruption MST reconfiguration.

FIG. 6 illustrates an example procedure for minimum disruption MST reconfiguration in accordance with one or more embodiments described herein. The procedure 600 starts at step 605, and continues to step 610, where a switch maintains a first MST region configuration having a particular VI mapping (e.g., "original" mapping from above). Then, in step 615, the switch may receive a second MST region configuration (e.g., "new") having a different VI mapping than the first configuration. As mentioned above, in step 620 both the first and second MST region configurations are maintained, while in step 625 the switch (MST module 246) determines the set of affected VLANs of the second configuration that have a different VI mapping from the first configuration (e.g., VLAN 51 from above, FIG. 3).

Once a trigger to apply the second configuration is received in step 630 (e.g., a BPDU, time, etc.), then in step 635 the switch blocks the affected VLANs for a delay, and also in step 640 applies the second configuration without restarting the MST process. For example, as described above, this may imply continuing to forward traffic on non-affected VLANs until the affected VLANs are unblocked (below), and/or by establishing new MST instances in the background while non-affected VLANs remain intact. In step 745, the switch may begin advertising BPDUs for the second configuration, and after the delay, may unblock the affected VLANs (step 650), e.g., and move corresponding port states, accordingly. Any port(s) not receiving a returned second configuration BPDU may be set as a boundary port(s) for the MST region. The procedure 600 ends in step 660.

The embodiments described herein provide for a minimum disruption MST reconfiguration (or, alternatively phrased, a minimum disruption MST restart) in a computer network utilizing MST. By blocking affected VLANs during transition from one region (VI mapping) to the next for a configurable amount of time, the novel techniques restrict the impact thereof to only the affected VLANs (e.g., for only several seconds during the delay for moving VLANs to an existing MST instance, and not thirty seconds conventionally for a full restart). In particular, the techniques described above may use existing MST BPDUs (e.g., without requiring any changes to the BPDUs) to trigger the reconfiguration (MDMR). Also, the dynamic aspects of one or more embodiments described herein alleviate the need for cumbersome and inefficient manual configuration.

While there have been shown and described illustrative embodiments that provide for a minimum disruption MST reconfiguration in a computer network utilizing MST, it is to be understood that various other adaptations and modifications may be made within the spirit and scope of the embodiments herein. For example, the embodiments have been shown and described herein with relation to particular standards and protocols (e.g., STP, MST, SNMP, VTP, BPDUs, particular types of devices, etc.). However, the embodiments in their broader sense are not so limited, and may, in fact, be used with any suitable technology, as may be appreciated by those skilled in the art.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

We claim:

1. A method, comprising:
   maintaining, at a first switch, a first multiple spanning tree (MST) region configuration that maps at least one virtual local area network (VLAN) to a first MST instance in an MST region;
   receiving, at the first switch, a second MST region configuration that maps the at least one VLAN to a second MST instance;
   detecting, at the first switch, a trigger to apply the second MST region configuration, the trigger includes a day and a time shared by all switches in the MST region;
   in response to detecting the trigger, applying the second MST region configuration by blocking the at least one VLAN for a delay based on the trigger; and
   moving the at least one VLAN to the second MST instance after expiration of the delay.

2. The method of claim 1, wherein the trigger comprises receiving a bridge protocol data unit (BPDU) having the second MST region configuration.

3. The method of claim 2, wherein the BPDU is received from a neighboring switch on a root port of the first switch.

4. The method of claim 3, further comprising:
   returning the BPDU on the root port; and
   transmitting the BPDU for the second MST region configuration on one or more non-root designated ports of the first switch to one or more corresponding neighboring switches.

5. The method of claim 1, wherein the day and the time shared by all of the switches in the MST region is a network day and network time.

6. The method of claim 1, further comprising:
   unblocking the at least one VLAN after the delay.

7. The method of claim 1, wherein the delay is nullified when the first switch receives a bridge protocol data unit (BPDU) from each of one or more corresponding neighboring switches on non-root designated ports.

8. The method of claim 1, further comprising:
   determining that a first port on the first switch is a boundary port for the MST region when a bridge protocol data unit (BPDU) is not received on the first port prior to the expiration of the delay.

9. The method of claim 1, further comprising:
   maintaining the first and second MST region configurations simultaneously until receiving a bridge protocol data unit (BPDU) having the second MST region configuration from all neighboring switches.

10. The method of claim 1, further comprising:
    determining that the second MST instance is a new MST instance; and creating the new MST instance.

11. The method of claim 1, wherein the first MST region configuration and the second MST region configuration map a plurality of VLANs to the first MST instance, and wherein the plurality of VLANs remain operational during the delay.

12. The method of claim 1, further comprising:
    determining a forwarding delay value of the MST region; and
    setting the delay to a value that is greater than the forwarding delay value.

13. An apparatus, comprising:
    a processor; and
    a computer-readable storage medium having stored therein instructions which, when executed by the processor, cause the processor to perform operations comprising:
       maintain a first multiple spanning tree (MST) region configuration that maps at least one virtual local area network (VLAN) to a first MST instance in an MST region;
       receive a second MST region configuration that maps the at least one VLAN to a second MST instance;
       detect a trigger to apply the second MST region configuration, the trigger includes a day and a time shared by all switches in the MST region;
       apply the second MST region configuration by blocking the at least one VLAN for a delay based on the trigger; and
       move the at least one VLAN to the second MST instance after expiration of the delay.

14. The apparatus of claim 13, the computer-readable storage medium having stored additional instructions which cause the processor to: set the delay to a date and time shared by a plurality of switches in the MST region.

15. The apparatus of claim 13, wherein the trigger comprises receiving a bridge protocol data unit (BPDU) having the second MST region configuration.

16. The apparatus of claim 15, the computer-readable storage medium having stored additional instructions which cause the processor to:
    return the BPDU with an agreement bit set for the second MST region configuration on a root port.

17. A non-transitory computer-readable storage medium having stored therein instructions which, when executed by a processor, cause the processor to perform operations comprising:
    maintaining a first multiple spanning tree (MST) region configuration that maps at least one virtual local area network (VLAN) to a first MST instance in an MST region;
    receiving a second MST region configuration that maps the at least one VLAN to a second MST instance;
    detecting a trigger to apply the second MST region configuration, the trigger includes a day and a time shared by all switches in the MST region;

in response to detecting the trigger, applying the second MST region configuration by blocking the at least one VLAN for a delay based on the trigger; and move the at least one VLAN to the second MST instance after expiration of the delay.

18. The non-transitory medium of claim 17, storing additional instructions which, when executed by the processor, result in operations comprising: unblocking the at least one VLAN after the delay.

19. The non-transitory medium of claim 17, wherein the first MST region configuration and the second MST region configuration map a plurality of VLANs to the first MST instance.

20. The non-transitory medium of claim 19, wherein the plurality of VLANs remain operational during the delay.

* * * * *